United States Patent [19]
Tagge et al.

[11] Patent Number: 5,295,612
[45] Date of Patent: Mar. 22, 1994

[54] ROLLER NOZZLE FOR DISPENSING FAST HARDENING FLUIDS

[75] Inventors: James Tagge, Great Barrington, Mass.; Carl Stigberg, Schenectady, N.Y.

[73] Assignee: Albany International Corp., Albany, N.Y.

[21] Appl. No.: 23,215

[22] Filed: Feb. 25, 1993

[51] Int. Cl.⁵ .............................................. B05B 15/02
[52] U.S. Cl. ................................. 222/135; 222/145; 222/148; 222/564; 222/575; 239/123; 239/214; 239/601; 239/602
[58] Field of Search ............... 239/104, 106, 114, 115, 239/123, 214, 380, 451, 601, 602; 222/575, 564, 145, 255, 135, 345, 148; 425/380, 382.3

[56] References Cited

U.S. PATENT DOCUMENTS

| | | |
|---|---|---|
| 1,674,229 | 6/1928 | Scruggs . |
| 2,645,813 | 7/1953 | Swallow . |
| 2,728,103 | 12/1955 | Benedict et al. . |
| 2,771,637 | 11/1956 | Silvasy et al. . |
| 3,879,157 | 4/1975 | Heesen . |
| 4,011,993 | 3/1977 | Mizuno et al. ...................... 239/214 |
| 4,638,951 | 1/1987 | Gabriel ............................... 239/451 |
| 4,963,309 | 10/1990 | Gohlisch et al. ................. 425/382.3 |
| 5,158,724 | 10/1992 | Yagi et al. ........................ 425/382.3 |

FOREIGN PATENT DOCUMENTS 8501223 11/1986 Netherlands ..................... 425/382.3

Primary Examiner—Karen B. Merritt
Attorney, Agent, or Firm—Kane, Dalsimer, Sullivan, Kurucz, Levy, Eisele & Richard

[57] ABSTRACT

An apparatus for dispensing liquids which harden in the presence of ambient atmospheric conditions includes a housing for receiving one or more liquids and rotating rollers having roller surfaces which define an orifice through which the liquid is dispensed. A doctoring surface continuously cleans the roller surfaces to eliminate clogging of the orifice or the deposition of hardened material on the housing.

20 Claims, 4 Drawing Sheets

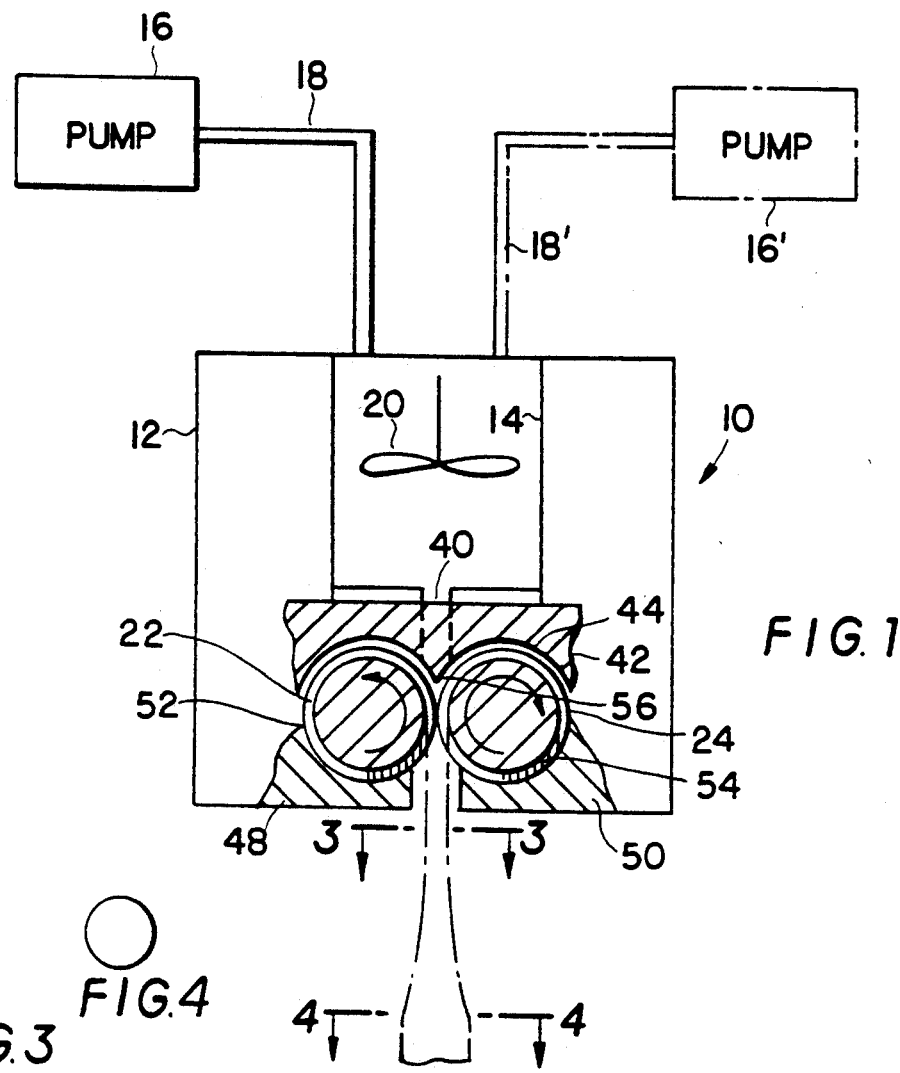
FIG. 1
FIG. 3  FIG. 4
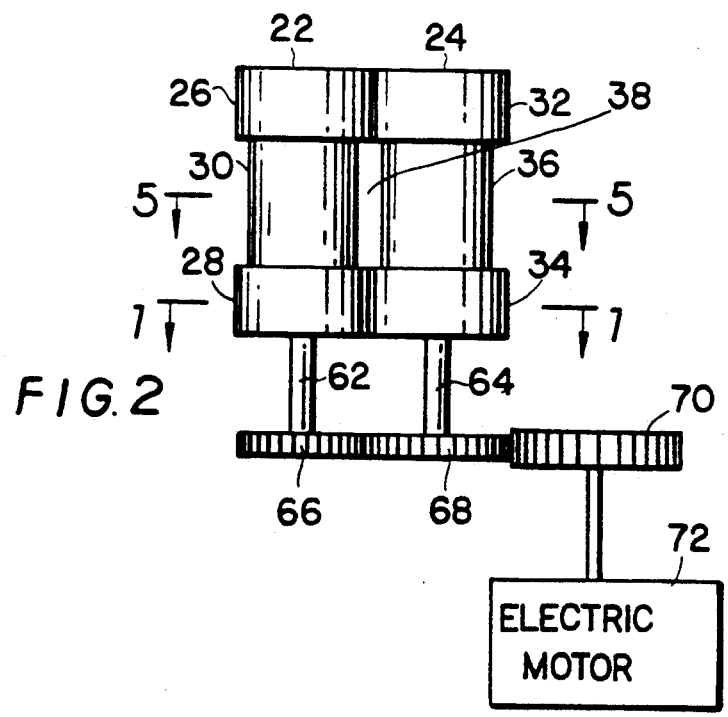
FIG. 2

ROLLER NOZZLE FOR DISPENSING FAST HARDENING FLUIDS

BACKGROUND OF THE INVENTION a. Field of Invention

This invention pertains to an apparatus useful for dispensing fluids which harden rapidly on exposure to ambient conditions and more particularly to an apparatus in which a dispensing nozzle is defined by two rotating members.

b. Description of the Prior Art

Various liquids are normally dispensed through a nozzle with a fixed orifice. However this type of apparatus is unsuitable for dispensing liquids such as various resins including urethane-based materials which hardened rapidly when exposed to air, they undergo a change of temperature or other ambient atmospheric characteristics. One problem with using standard dispensing apparatus with these liquids is that the orifice gets clogged with hardened material and hence it must be frequently changed or cleaned. Another problem has been that the liquid tends to hardened and form deposits in elongated shapes around the nozzle in a random manner, a phenomenon referred to in the art as 'bearding'. This build up interferes with the dispensing operation and when it gets too long it can re-direct the flow of the liquid causing various problems.

OBJECTIVES AND SUMMARY OF THE INVENTION

In view of the above-mentioned disadvantages of the prior art, it is an objective of the present invention to provide an apparatus for dispensing resinous liquids in which the nozzle is not blocked over time by solids.

Yet another objective is to provide a liquid dispensing apparatus which does not require frequent changes of nozzles.

A further objective is to provide an apparatus with a novel nozzle design which prevents the bearding phenomenon associated with liquids which solidify when exposed to ambient atmospheric conditions.

Other objectives and advantages shall become apparent from the following description of the invention. Briefly a liquid dispensing apparatus constructed in accordance with this invention includes a housing receiving one or more liquids for dispensing, and a pair of rollers with rotating roller surfaces. The roller surfaces define an orifice through which the liquid is dispensed. As the rollers rotate, their edges are constantly cleaned by doctoring surfaces for avoiding clogging the orifice and bearding. Another purpose for doctoring, is to return the doctored liquid into the turbulent mixing area of the main liquid stream where it is combined with and exits the orifice with said main liquid stream.

BRIEF DESCRIPTION OF THE DRAWINGS

FIG. 1 shows a side cross-sectional, somewhat schematic view of a dispensing apparatus constructed in accordance with this invention;

FIG. 2 shows a plan cross-sectional view of the apparatus of FIG. 1;

FIG. 3 shows a plan cross-sectional view of the liquid being dispensed as it exits the nozzle;

FIG. 4 shows a plan cross sectional view of the dispensed liquid stream somewhat below the dispensing nozzle;

DETAILED DESCRIPTION OF THE INVENTION

Figure 5:
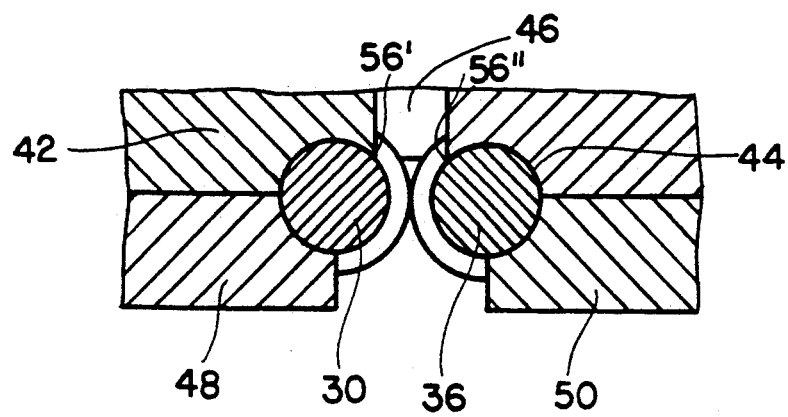
FIG. 5 shows a side cross-sectional view of the nozzle.

As shown in the drawings, and particularly in FIG. 1, apparatus 10 includes a housing 12 with a holding tank 14. A pump 16 supplies a resinous liquid to tank 14 through a pipe 18. The apparatus may also be used to dispense a material obtained by mixing several liquid phases, which material hardens when exposed to ambient atmospheric conditions. This may be accomplished of example by supplying to tank 14 one phase via pump 16 and pipe 18, a second phase through a pump 16' and a pipe 18'. Additional phases may be added by the use of additional pumps as required. The different phases are then mixed in tank 14 for example by using a mixing blade 20.

Under tank 14, apparatus 10 is provided with two rollers 22, 24. Each of the rollers is generally bar-bell shaped, however the rollers may have other shapes as well. Thus, roller 22 has two axially spaced cylindrical sections 26, 28 having the same diameter. A third cylindrical section 30 has a smaller diameter and extends coaxially between the sections 26, 28. Roller 24 has similarly two sections 32, 34 with diameters equal to the diameters of sections 26, 28 and a third section 36 having the same diameter as section 30. The two rollers are disposed rotatably within housing 12 with their axes in parallel, and with sections 26, 32 and 28,34 in an abutting relationship as shown in FIG. 2. Since sections 30, 36 are smaller, they define a generally rectangular space or orifice 38.

Figure 6:
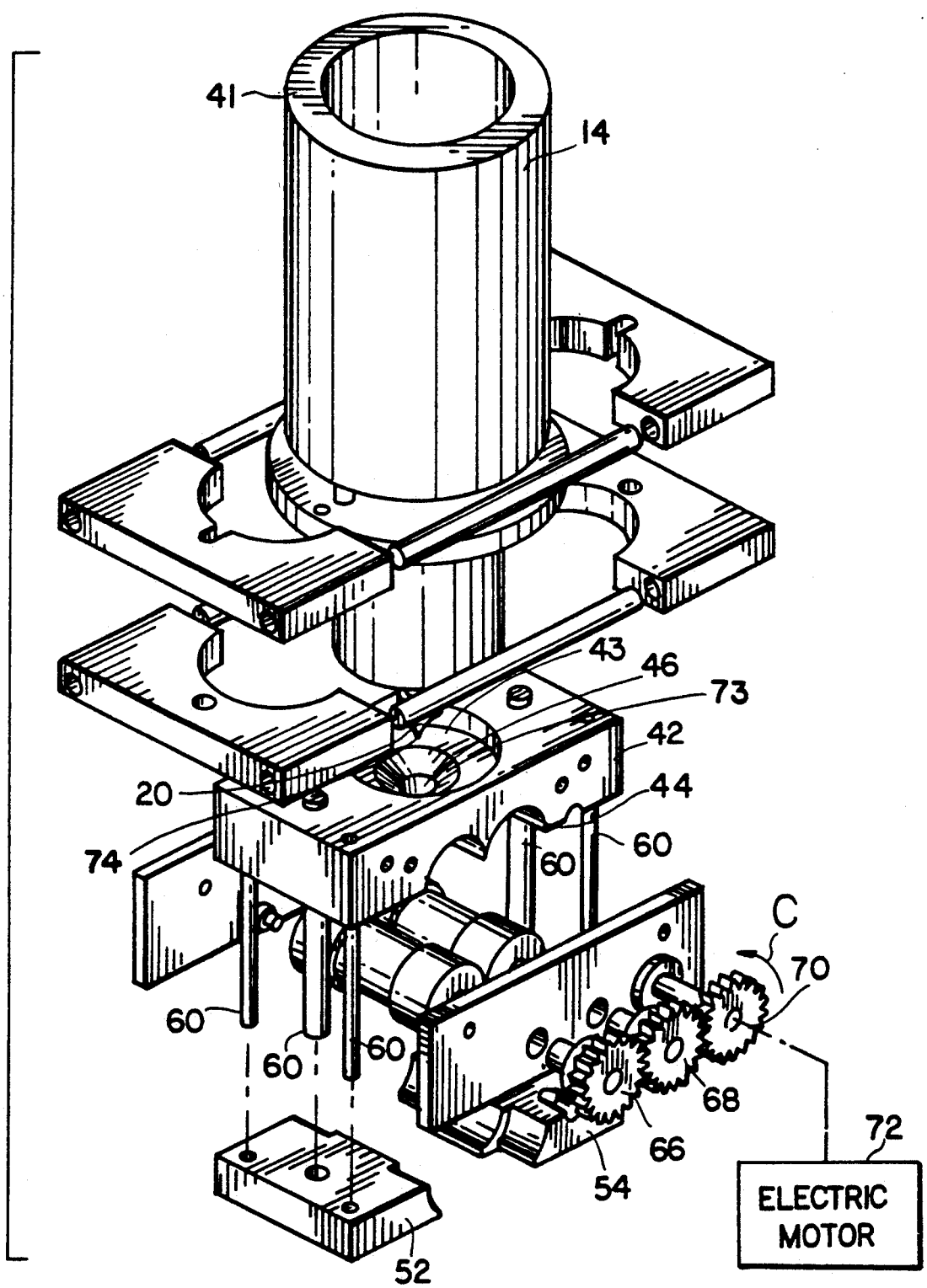
FIG. 6 shows an orthogonal exploded view of the apparatus of FIGS. 1, 2 and 5.

Also within housing 10 there are provided three other members. As best seen in FIG. 6, one top doctoring member 42 is disposed above rollers 22, 24 and it has a bottom surface 44 profiled to conform to the surfaces of the rollers. Surface 44 includes a tongue 56 extending between the rollers 22, 24. Member 42 also has a through-hole 46 leading from the bottom of tank 14 to orifice 38. Tank 14 may be provided as an integral unit with a bottom hole 40. Alternatively, tank 14 may be formed with a cylindrical wall 41 closed off by member 42. In this latter configuration, member 42 is shaped at the top with a circular depression 43 which forms the bottom for the tank 14.

Under the doctoring member 42, there are two bottom members 48, 50. Each of these members has a top surface, 52, 54 (FIG. 1) shaped to conform to the surfaces of the rollers 22, 24 to retain the rollers 22, 24 against the upper doctoring surface 44. In this manner, as the rollers rotate about their respective axes, the surfaces of their circular sections 26-36 are constantly wiped by the shaped surfaces 44, 52, 54 to keep the rollers clean. More specifically, the two rollers have surfaces which are continuously rotating in directions opposite the flow of liquid through orifice 38, as shown by the arrows in FIG. 1 and therefore most of the doctoring occurs at the tongue 56 and leading edges 56', 56'' of member 42 (FIG. 5). Tongue 56 doctors the surfaces of the larger cylindrical sections of the rollers while edges 56', 56" doctor the surfaces of the smaller cylindrical sections.

Members 52, 54 are attached to member 42 and to the housing by rods 60.

Each of the rollers 22, 24 is mounted for rotation on an axle 62, 64, respectively. Axle 62 is terminated with a toothed gear 66, while axle 64 is terminated with a toothed gear 68. The toothed gears 66, 68 are intermeshed. In addition, toothed gear 68 is intermeshed with a third toothed gear 70. Gear 70 is coupled to a driving member such as an electrical motor 72. Motor 72 drives gear 70 in the counterclockwise direction as indicated by arrow C in FIG. 6 causing gears 68, 66 to rotate in the clockwise and counterclockwise directions respectively.

The above-described apparatus operates as follows. One or more resinous liquids are fed to tank 14 as described above. If necessary, the contents of the tank are mixed continuously to insure that the liquid is dispensed as a homogenous mass. For this purpose, the top of hole 46 may be chamfered as at 73 so that the tip 74 of blade 20 (seen in FIG. 6) may extend to the hole 46.

Importantly, while the liquid flows between the rollers, the rollers continuously rotate with their opposed, facing surfaces moving in a direction opposite (that is, upward) to the direction of the flow. In this manner the two rollers define therebetween a moving nozzle. Because roller surfaces are constantly being doctored, the liquid does not solidify on the rollers' surfaces and hence there is no need to clean or replace them. Furthermore the continuous doctoring of the roller surfaces insures that no material is solidified on the housing and hence the bearding phenomenon is also avoided.

The liquid from tank 14 flows through hole 46 and out of housing 12 through the orifice 38. Because orifice 38 is generally rectangular the liquid flow out of housing 12 is also generally rectangular a shown in FIG. 3. However surface tension forces the liquid flow into a normal circular cross-section as shown in FIG. 4.

The size, shape and speed of the rollers depends on the nature of the material to be dispensed, including its viscosity, specific gravity and so on, as well as the desired dispensing rate. It has been found that acceptable results are obtained if the rollers have a maximum diameter in the range of $\frac{1}{2}$-1" and form a nozzle 38 having dimensions ranging from $\frac{1}{2} \times 1/16$" to $1 \times \frac{1}{4}$". A rectangular or square shaped nozzle is preferably because it can be easily provided between rollers having straight cylindrical sections as described above. However nozzles having other cross-sectional shapes, such circles, ellipses can also be made using rollers with appropriately profiled surfaces. The rollers are preferably made of stainless steel or alternatively of plastic material.

Figure 7:
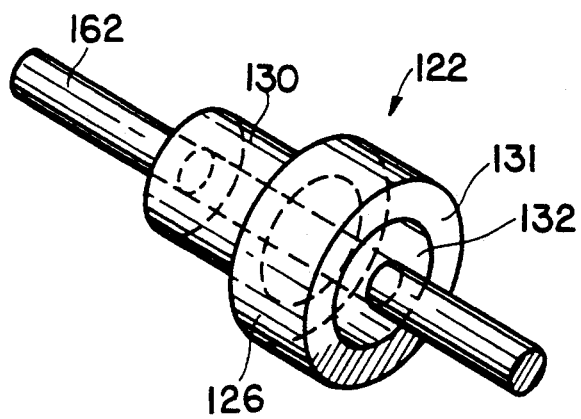
FIG. 7 shows a side orthogonal view showing a roller in accordance with an alternate embodiment.
Figure 8:
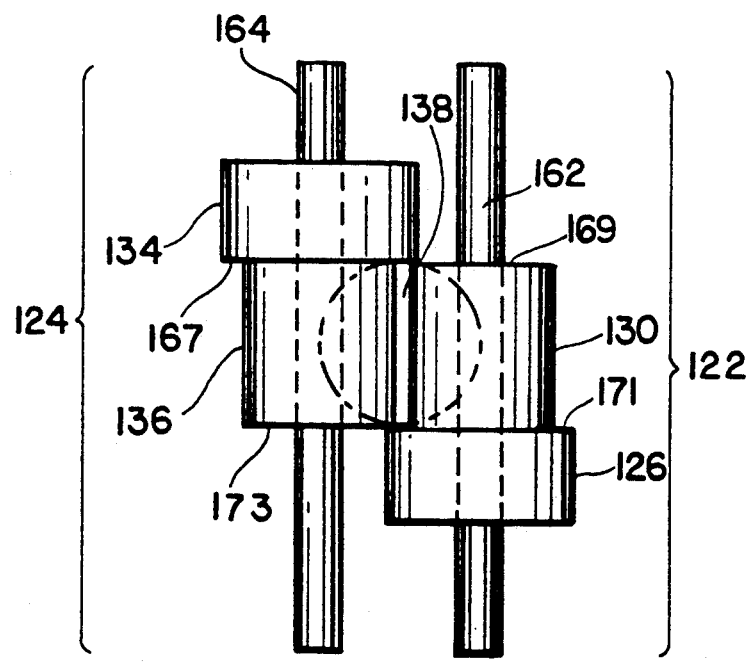
FIG. 8 shows a plan view of the nozzle formed by two rollers constructed in accordance with FIG. 7.

As mentioned above, the orifice may be formed by rotating rollers having other shapes as well. For example, FIG. 7 shows a roller 122 formed of an axle 162, a first cylindrical member 130 and a second cylindrical member 126. Member 126 is axially shorter than member 130 and is formed with a cylindrical bore of the same size as the outer diameter of member 130. Similarly, member 130 is formed with an axial bore of the same size as the diameter of axle 162. These members are made for example of hardened steel separately. The roller 122 is then formed by first shrink fitting member 126 on one side of member 130 with their axial faces 131, 132 disposed in a co-planar relationship, and then mounting and shrink fitting member 130 on axle 162 in the position shown in FIG. 7. A second roller 124 is made in a similar manner having an axle 164, with a first member 136 and a second member 134, shown in FIG. 8. These two members may then be positioned as shown in FIG. 8 with axles 162, 164 disposed in parallel and spaced in such a manner that an inner axial face 167 of member 134 is abutting an outer face 169 of member 130, and an inner face 171 of member 126 is abutting an outer face 173 of member 136. In this manner a rectangular orifice 138 is formed between the rollers 122, 124. The rollers 122, 124 are rotated in opposite directions in the same manner as described in the first embodiment. Preferably, the rollers 122, 124 are made of hardened steel so that the faces do not wear off easily. In addition, the rollers, or at least their faces 167, 169, 171, 173 are coated with a material to reduce friction therebetween during rotation. In addition, springs may be used on the axles to urge the rollers toward each other in the position shown in FIG. 9 whereby the orifice 138 is maintained automatically even if the faces are worn off.

Figure 9:
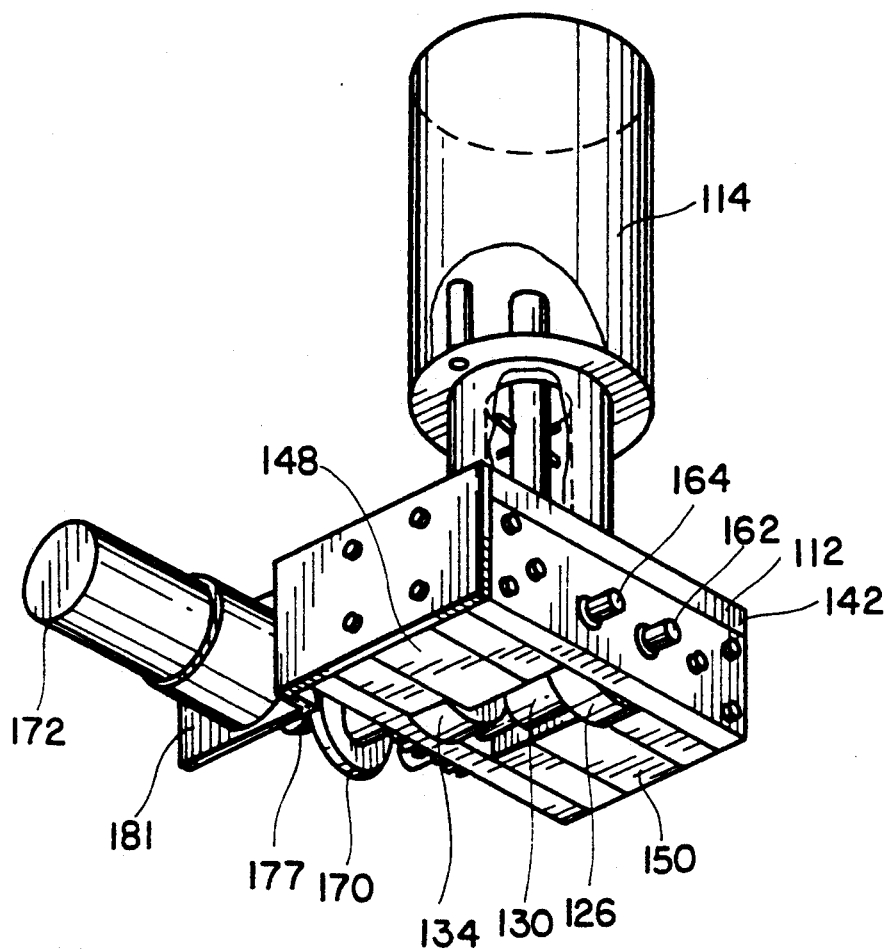
FIG. 9 shows a bottom orthogonal view of a dispensing apparatus using the rollers of FIGS. 7 and 8.

As shown in FIG. 9, rollers 122, 124 are disposed in a housing 112. The housing includes an upper portion 142 shaped and sized to doctor the cylindrical surfaces of members 126, 130, 134, 136 in a manner similar to the previously described embodiment. The housing also includes two lower support portions 148, 150. A holding tank 114 is disposed on top housing 112 as shown.

Advantageously, the two axles 162, 164 are provided with meshing toothed gears (not shown) similar to the gears 66, 68 of FIG. 2. In addition, a beveled or helical gear 170 is mounted on axle 164. This gear 170 is meshed with a gear 177 mounted on a motor 172. Motor 172 is mounted on housing 112 by a bracket 181.

The embodiment of FIGS. 7-9 operates in the same manner as the embodiment previously described.

Obviously numerous modifications may be made to this invention without departing from its scope as defined in the appended claims.

We claim:

1. An apparatus for dispensing liquids comprising:
    a housing;
    a pair of rollers rotatably mounted on said housing, said rollers having opposed roller surfaces each said surfaces having a first surface portion and a second surface portion, said second surface portion having a smaller diameter than said first surface portion, said second surface portions being spaced apart from each other to define a nozzle having a preselected cross-section;
    liquid supply means for providing a liquid flow through said nozzle; and
    drive means for rotating said rollers with said roller surfaces moving in a direction opposite said liquid flow.

2. The apparatus of claim 1 wherein said housing includes doctoring members for doctoring said roller surfaces.

3. The apparatus of claim 1 wherein said housing includes a tank for holding liquid from said supply means.

4. The apparatus of claim 3 wherein said liquid supply means provides several input liquids to said tank.

5. The apparatus of claim 4 further comprising mixing means for mixing said input liquids into a homogenous liquid.

6. An apparatus for dispensing a resinous liquid which hardens when in contact with ambient atmospheric conditions, said apparatus comprising:

a pump for supplying continuously an input liquid;

a housing for receiving said input liquid;

roller means mounted rotatably on said housing and including opposed roller surfaces, each roller surface including a first surface portion and a second surface portion, said second surface portion having a diameter smaller than said first surface portion, said second surface portions defining an output nozzle for generating an output liquid flow from said input liquid; and drive means for rotating said roller means with said roller surfaces moving in a direction opposite said liquid flow.

7. The apparatus of claim 6 wherein said housing includes a tank for holding said input liquid.

8. The apparatus of claim 7 further comprising mixing means for mixing the input liquid in said tank.

9. The apparatus of claim 6 further comprising doctoring means disposed in said housing for doctoring said roller surfaces.

10. The apparatus of claim 6 wherein said second surface portions define a rectangular orifice therebetween.

11. An apparatus for dispensing a resinous liquid which hardens in contact with ambient atmospheric conditions, said apparatus comprising;

a housing with a tank;

a first and a second roller mounted in said housing and having opposed roller surfaces, each roller surface including a first surface portion and a second surface portion, said second surface portion having a diameter smaller than said first surface portion, said second surface portions defining an orifice for a liquid flow from said tank; and drive means for rotating said rollers.

12. The apparatus of claim 11 wherein said drive means rotates said rollers with said roller surfaces moving in a direction opposite said liquid flow.

13. The apparatus of claim 11 wherein said rollers define a rectangular orifice.

14. The apparatus of claim 11 wherein each said first surface portion includes a first cylindrical section and each said second surface portion includes a second cylindrical section disposed co-axially with said first section, the second sections of said rollers defining said orifice therebetween.

15. The apparatus of claim 14 wherein each said roller further comprises a third cylindrical section, said second section being disposed between said third and said first sections.

16. The apparatus of claim 14 wherein said first sections have inner surfaces and said second sections have outer surfaces, with said rollers being spaced with the inner surfaces of the first section abutting the outer surfaces of the second sections to define said orifice therebetween.

17. The apparatus of claim 14 wherein each said rollers consist of an axle, a first member mounted on said axle and having a first member axial length and a second member mounted on said first member and having a second member axial length shorter than said first member axial length.

18. The apparatus of claim 11 further comprising a doctoring member disposed above said rollers and having a doctoring member surface contoured to match said rollers.

19. The apparatus of claim 18 wherein said doctoring member surface includes a doctoring edge extending between said rollers.

20. The apparatus of claim 11 wherein said resinous liquid is composed of several phases and wherein said apparatus comprises supply means for supplying said phases and mixing means for mixing said several phases in said tank.

* * * * *